(12) United States Patent
Feige et al.

(10) Patent No.: US 6,204,507 B1
(45) Date of Patent: Mar. 20, 2001

(54) DEVICE FOR TESTING FLAT MATERIALS

(75) Inventors: Christian Feige, Grafing; Franz-Josef Urban, Nieder-Olm; Steffen Hildebrandt, Dresden, all of (DE)

(73) Assignee: Vacutec Messtechnik GmbH, Dresden (DE)

(*) Notice: Subject to any disclaimer, the term of this patent is extended or adjusted under 35 U.S.C. 154(b) by 0 days.

(21) Appl. No.: 09/077,754
(22) PCT Filed: Dec. 3, 1996
(86) PCT No.: PCT/DE96/02314
§ 371 Date: Jun. 5, 1998
§ 102(e) Date: Jun. 5, 1998
(87) PCT Pub. No.: WO97/21075
PCT Pub. Date: Jun. 12, 1997

(30) Foreign Application Priority Data

Dec. 5, 1995 (DE) .............................. 195 45 340

(51) Int. Cl.[7] ........................................... G01J 1/42
(52) U.S. Cl. .................. 250/372; 250/308; 250/358.1; 250/374
(58) Field of Search ................. 250/308, 358.1, 250/359.1, 385.1, 374

(56) References Cited

U.S. PATENT DOCUMENTS 3,160,753  12/1964  Varner .
4,720,808  1/1988  Repsch .
5,025,154  6/1991  Ritala et al. .
5,796,110  *  8/1998  An et al. ..................... 250/385.1

FOREIGN PATENT DOCUMENTS

| 1812893 | 6/1970 | (DE) . |
| 3140714 | 4/1983 | (DE) . |
| 3327267 | 2/1985 | (DE) . |
| 3707107 | 9/1988 | (DE) . |
| 60-230009 | 11/1985 | (EP) . |
| 0233389 | 8/1987 | (EP) . |
| 1260805 | 4/1961 | (FR) . |

* cited by examiner

*Primary Examiner*—Constantine Hannaher
*Assistant Examiner*—Otilia Gabor
(74) *Attorney, Agent, or Firm*—Jordan and Hamburg LLP

(57) ABSTRACT

A device for testing flat materials during production of material webs has a radiation source from which radiation passes through the material under investigation, residual radiation on another side of the material being detected by a gas-filled ionization detector. The detector arrangement has a plurality of interconnected measurement chambers provided with collector electrodes and arranged inside a common housing. The measurement chambers can together be evacuated and filled with an ionizable gas. Each of the measurement chambers is allocated its own radiation inlet window. The radiation source is allocated to the measurement chamber and has a linear radiation distribution.

29 Claims, 8 Drawing Sheets

DEVICE FOR TESTING FLAT MATERIALS

BACKGROUND OF THE INVENTION

The invention relates to an apparatus for checking weights per unit area during production of sheets of material by means of a source of radiation, which irradiates the sheet of material or the material being measured, and for detecting residual radiation on a side of the material being measured opposite to a radiation source using a gas-filled ionization detector.

Such apparatuses are used, for example, for continuously measuring the thickness of cold-rolled or hot-rolled metal sheets or foils and also for continuously measuring the thickness of paper sheets or the like. The measurement is made pointwise using a radiation source, such as an X-ray or nuclear radiation source of suitable intensity, type of radiation and energy, the intensity of the radiation, attenuated by the sheet of material or by the material being measured, is measured by an ionization chamber. For the case that a thickness profile is to be measured over a whole width of the sheet of material, the source of radiation and the ionization chamber can be fastened to a carrier, which then, embracing the sheet of material to be measured, is moved transversely over it. However, it is a disadvantage in this case that the thickness continues to be measured pointwise, which leads, particularly in the case of very rapidly moving sheets of material, as is usually the case with mill trains, to the fact that only a basically incomplete statement can be made concerning the thickness of the material over the width of the sheet. Admittedly, it is possible to interpolate the measured values over the whole width of the material arithmetically; however, such a procedure does not always provide the desired accuracy.

A similar result is achieved if a plurality of ionization chambers is disposed linearly next to one another and the radiation source is moved in a traversing framework relative to the ionization chambers and transversely to the direction of motion of the sheet of material to be measured. The use of a linear source of radiation and an ionization chamber, which can be moved relative to this source, is also known.

However, when material is moving quickly, control processes and, with that, adjustments of a manufacturing process can be realized only with difficulty. For these reasons, measuring devices were developed with which continuous measurements over the whole width of the material are possible.

Such an apparatus for measuring the thickness of flat profiles is known from DE 31 40 714 A1. In this case, above the flat profile to be measured, one or more punctiform sources of radiation are disposed, to which, in each case, a plurality of ionization chambers are disposed below the flat profile. Since the sources of radiation are constructed as point sources and the radiation is masked in a fan fashion, the ionization chambers, assigned in each case to a radiation source, are directed towards the radiation source. For this purpose, the ionization chambers are disposed in a collimator girder, which is provided with cylindrical collimator openings, which have axes aligned precisely with the source of radiation. However, it is not achieved with this arrangement that the radiation intensity, reaching each ionization chamber, is the same.

A similar apparatus is evident from DE 37 07 107 A1. In this case, the ionization chambers or the detectors, distributed over the surface of the material to be measured, are disposed in several rows. With this, an improvement in resolution can be achieved.

It is a common feature of all these apparatuses that either an expensive mechanical traversing system is required or a highly precise alignment of the ionization chambers or of the detectors must be assured in order to arrive at comparable measurement results. Moreover, when several ionization chambers are used, an appreciable technical effort is required in order to assure, as far as possible, the same parameters for all ionization chambers. Failing that, an expensive, constant compensation must be carried out, since gas fillings necessarily result in changes in the parameters.

SUMMARY OF THE INVENTION

It is therefore an object of the invention to provide an apparatus for checking the weights per unit area which avoids deficiencies of the state of the art and, in particular, provides detailed information about weight per unit area.

Briefly stated, the present invention provides a device for testing flat materials during production of material webs using a radiation source from which radiation passes through the material under investigation. Residual radiation on another side of the material is detected by a gas-filled ionization detector having a detector arrangement including a plurality of interconnected sections provided with collector electrodes and arranged inside a common housing. The sections can together be evacuated and filled with an ionizable gas. Each of the sections is allocated its own radiation inlet window. The radiation source allocated to the sections has a linear radiation distribution.

According to a feature of the invention, it is further provided that the collector electrodes are mounted on electrically conducting connecting pieces, which are embedded over insulators in a bottom of the detector arrangement.

The present invention further includes the sections being disposed next to one another and covering a whole width of the material that is to be measured.

According to a still further feature of the invention, there is further provided a feature in that a shape of a radiation entry window corresponds to a cross section of the sections of the detector arrangement. In an embodiment the radiation entry window and the sections are constructed circularly and are disposed next to one another. Alternatively, the radiation entry windows are constructed circularly and the associated sections are constructed angularly. Still another option is that all the sections are provided with a common strip-shaped radiation entry window.

Yet another feature of the present invention is that the radiation source consists of an isotope source. Furthermore, the radiation source optionally extends over all of the sections.

Another feature of the present invention provides a collimator assigned to the radiation source. In an embodiment, the collimator is disposed between the radiation source and the material that is to be measured.

Another feature of the present invention includes a collimator having openings with cross section of which is smaller than a cross section of the radiation entry windows. Optionally, walls of the openings diverge in the direction of the detector arrangement.

Yet a further feature of the present invention provides that the radiation source is disposed directly above the material that is to be measured.

The present invention further provides that collector electrodes are connected with current-voltage converters. Further provided by the present invention is that values of measurements, supplied by the current-voltage converter, are digitized and are supplied in parallel or serially to an interface of an evaluating software.

Another feature of the present invention includes a point-shaped source of radiation assigned to each of the sections. Furthermore, radiation sources are disposed at an equal distance from the sections. Optionally, a soft beta emitter is used as radiation source. Alternatively, an industrial radiating system is used as a radiation source.

The invention provides for measuring a transverse profile of sheets of material so that it is possible to adjust a production process directly. Since it is no longer necessary to move the source of radiation and the measurement chambers during the measuring process, the technical effort is reduced appreciable. Moreover, a small distance between the source of radiation and the measurement chambers permits the use of soft radiation. The common gas filling prevents sensitivity changes caused by the filling gas.

BRIEF DESCRIPTION OF THE DRAWINGS

The invention will be explained in greater detail by means of examples. In the associated drawings.

DETAILED DESCRIPTION

Figure 1:
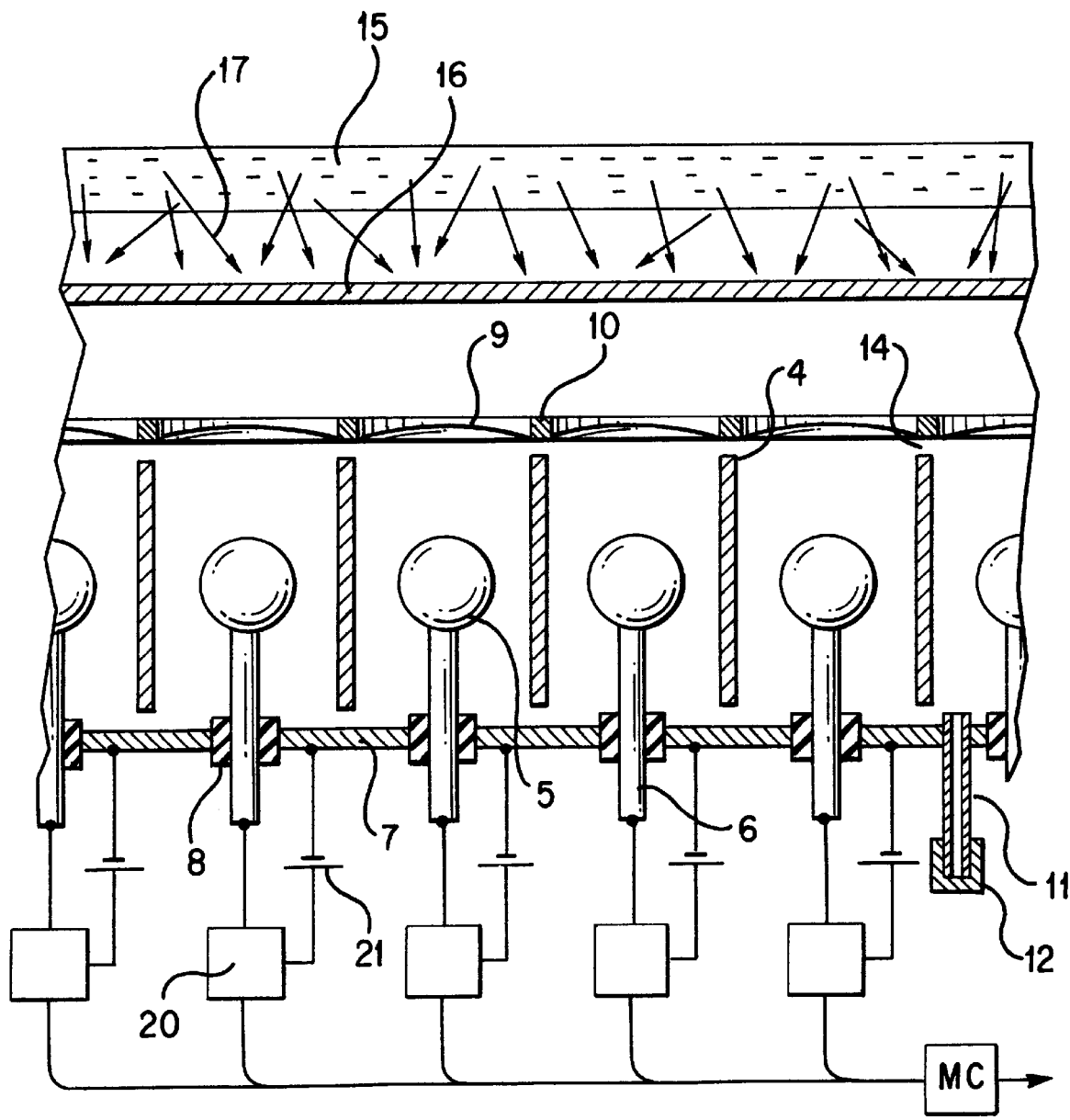
FIG. 1 shows a detector arrangement of the present invention with a linear source of radiation.
Figure 2:
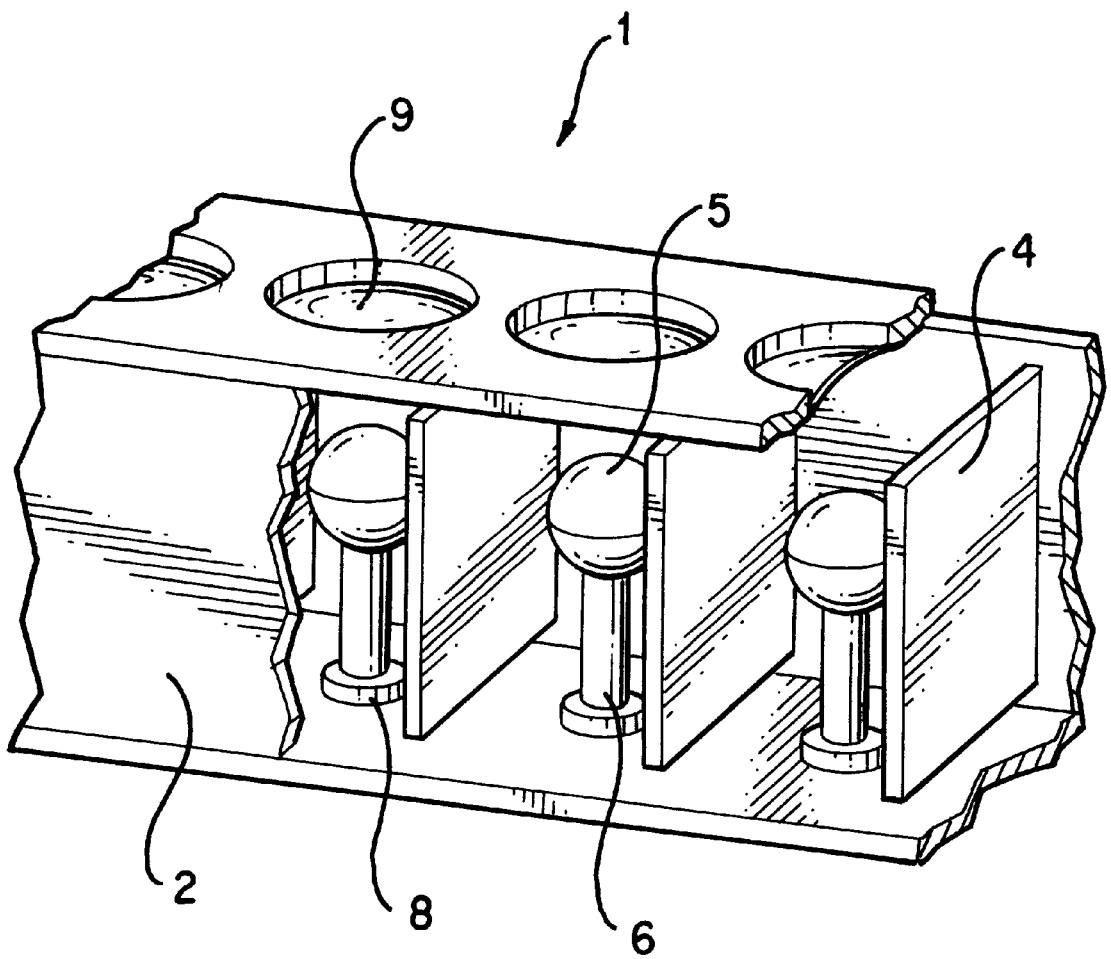
FIG. 2 shows a perspective detailed representation of the detector arrangement of FIG. 1.
Figure 3:
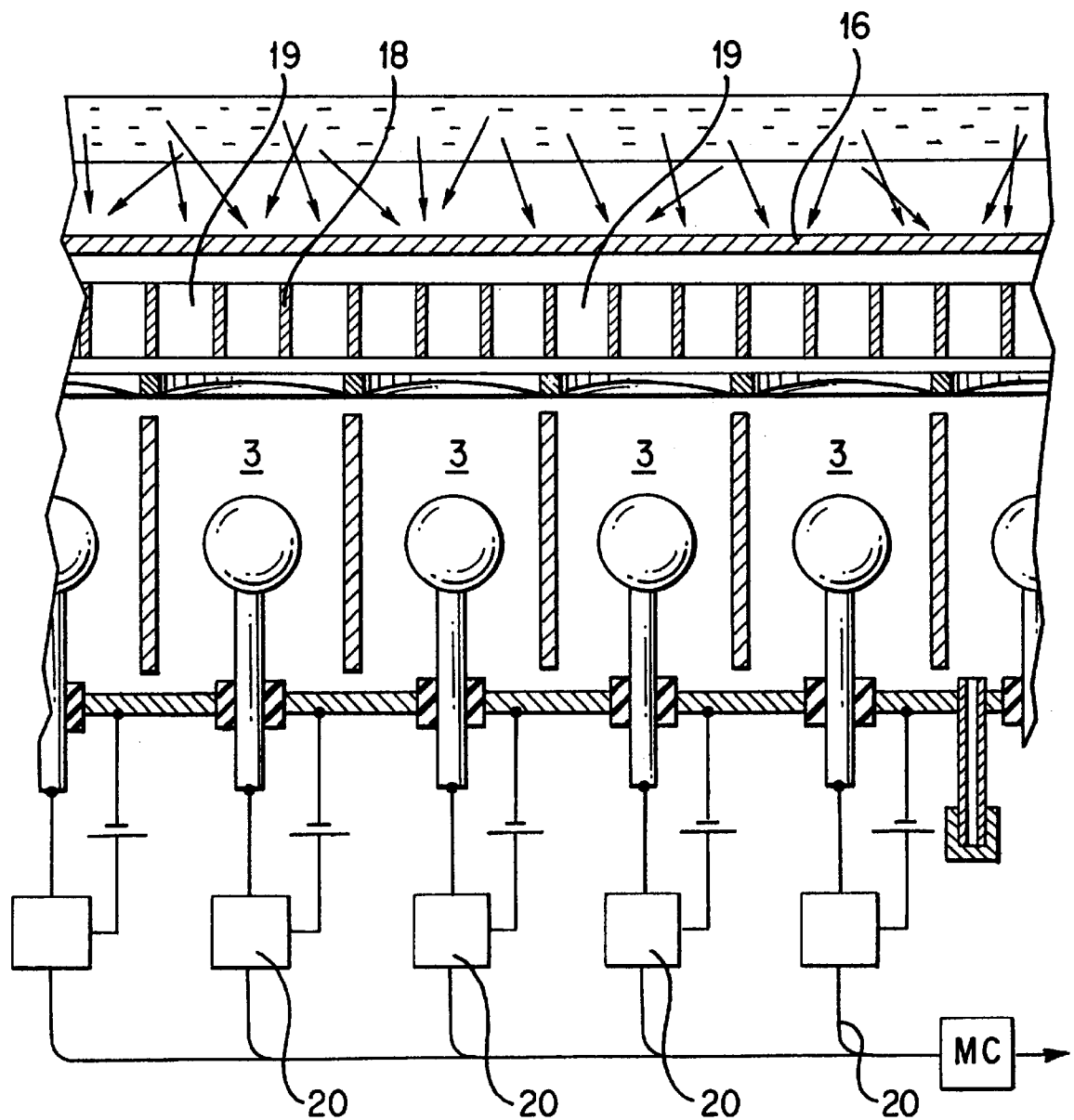
FIG. 3 shows a detector arrangement of the present invention with a linear source of radiation and a collimator.

FIGS. 1 and 2 show a detector arrangement 1, comprising a trough-shaped housing 2, in which there are sections, or measuring chambers 3 as shown in FIG. 3. The measuring chambers 3 are bounded by electrodes 4, disposed between the measuring chambers 3, and by the housing 2 of the detector arrangement 1. Within the measuring chambers 3, collector electrodes 5 are mounted on connecting supports 6, which are fixed gas tight to the bottom 7 of the housing 2 via insulators 8.

An upper end of the housing 2 is formed by a closing panel 10, which is provided with radiation entry windows 9 connected gas tight with the housing 2. The radiation entry windows 9 are closed off in the usual manner by a thin metal foil, which preferably is under tension and curved upward.

For evacuating and for admitting an ionizable gas, there is a vacuum connecting piece 11 in the bottom 7 of the housing 2. This vacuum connecting piece, after gas pressure has been adjusted to a required value within the housing 2, can be sealed off by a seal 12.

As can be seen from FIG. 1, the electrodes 4 are connected only with the side walls of the housing 2 so that lower and upper end edges 13 leave free a space 14 to the bottom 7 or to the closing panel 10. Instead of these spaces 14, it is also possible to provide slots or boreholes in the electrodes 4. In this way, it is ensured that, with respect to the gas filling the housing 2, physical parameters can be adjusted to the same values throughout the housing 2 and, with that, within the measuring chambers 3.

The detector arrangement 1 permits soft beta radiators to be used, so that possibilities for using the equipment can be extended particularly to materials with a low mass per unit area. Above the detector arrangement 1 and at a small distance from the detector arrangement 1, a linear radiation source 15 is disposed in the form of an isotope source. It is, however, also possible to use any other source of radiation, the selection of which depends on the nature of the material 16, which is to be measured and is passed between the radiation source 15 and the detector arrangement 1, so that the radiation 17 passes through the material 16 and causes an ionization of the gas in the measuring chambers 3. Accordingly, it is also possible, in principle, to use point radiators, in which case a point radiator would have to be assigned to each of the measuring chambers 3.

Instead of the isotope source, an industrial radiating system, such as an electron accelerator or X-ray tubes, can also be used as the radiation source 15.

According to FIG. 3, a collimator 18 has openings 19 disposed in each case above one of the measuring chambers 3. The collimator 18 is disposed directly below the radiation source 15. As a result, there is a partial masking of the radiation 17 and, with that, the values measured by the measuring chambers 3 can be assigned unambiguously to the material 16 being measured.

Due to the parallel arrangement of the measurement chambers 3 and a colinear emission of the radiation due to the use of the linear radiation source 15 in conjunction with the collimator 18, the problems associated with the divergence of the radiation are eliminated.

Chamber current, caused by the ionizing radiation 17, is converted using current voltage-converters 20, which are connected to the connecting supports 6 and can be evaluated subsequently in the usual manner.

With that, it is possible to determine continuously and with simple means a transverse profile of the material 16 to be measured. As a result, it is also becomes possible to adjust the production process directly. Likewise, the data obtained can be used to evaluate and document the production process.

In order to collect the charges released in the detector arrangement 1, a direct current source 21 is connected between the collector electrodes 5 and the housing 2.

The number and size of the measurement chambers 3, which must be disposed within the housing 2, are restricted only by the resolution required and by the width of the sheet of material, which is to be measured.

Figure 4:
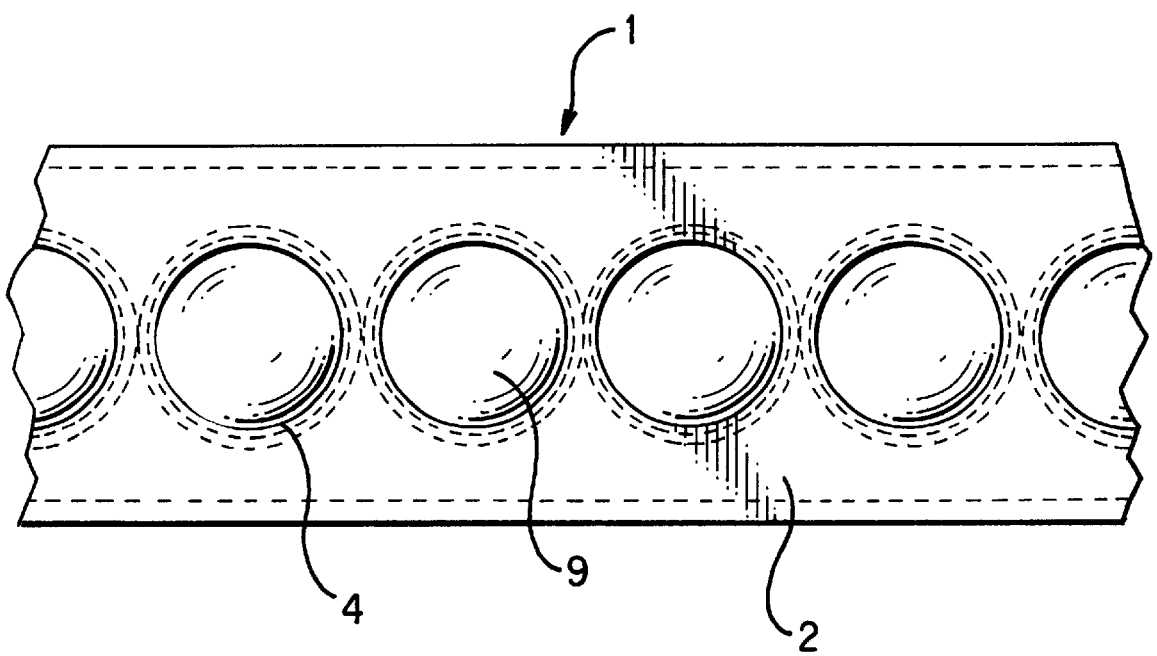
FIG. 4 shows a detector arrangement of the present invention with circular sections and associated radiation entry windows.
Figure 5:
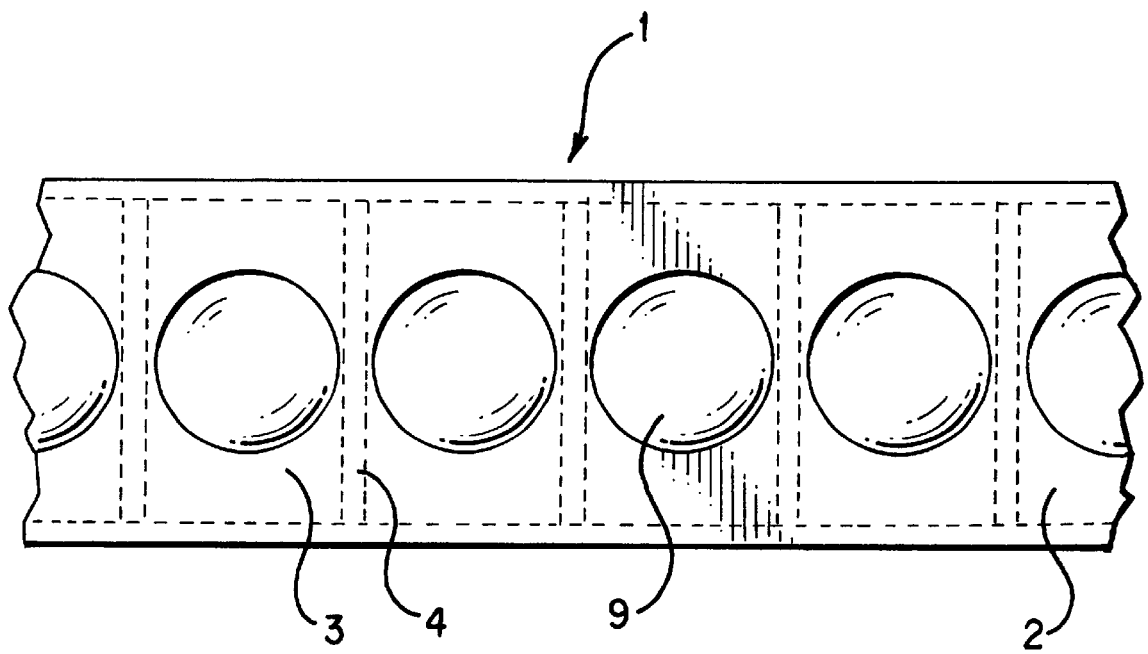
FIG. 5 shows a detector arrangement of the present invention with angular sections and circular radiation entry windows.

FIG. 4 shows a plan view of a detector arrangement 1 with circular measurement chambers 3 and with associated radiation entry windows 9 and FIG. 5 shows a detector arrangement 1 with angular measurement chambers 3 and circular radiation entry windows 9.

Figure 6:
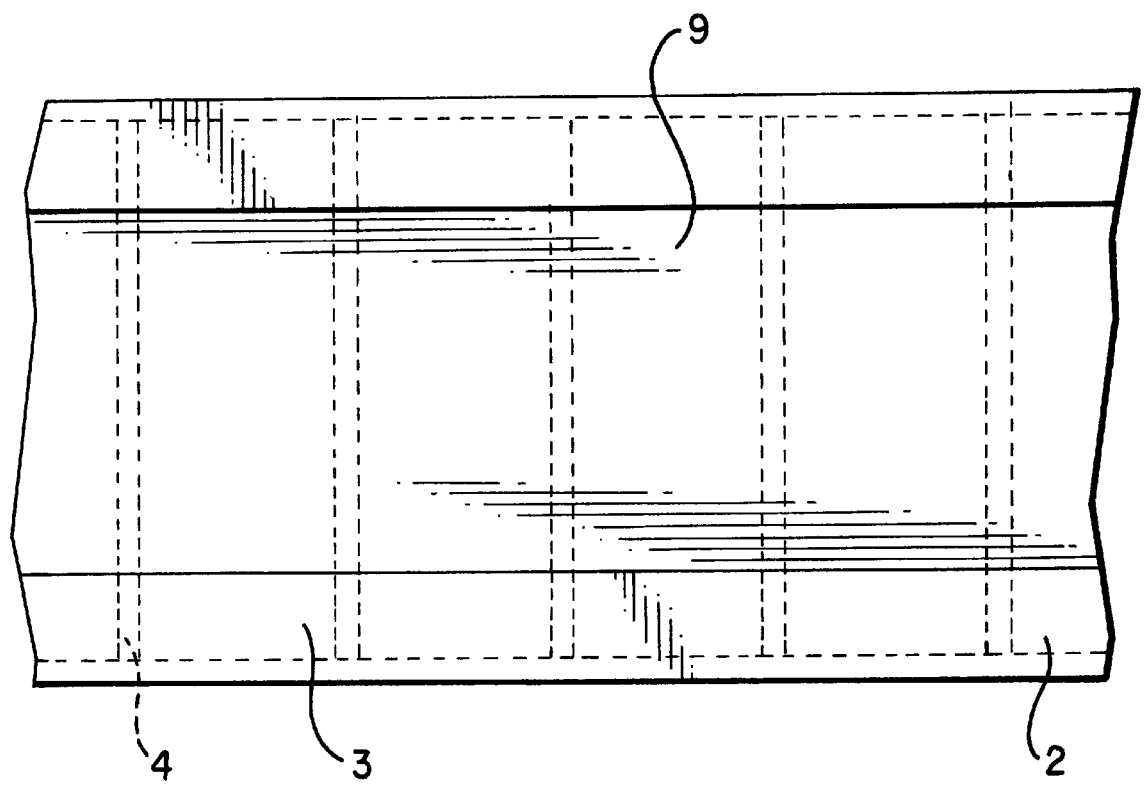
FIG. 6 shows an arrangement of sections of the present invention with a continuous radiation entry window.

FIG. 6 shows a variation of the detector arrangement 1, for which a continuous radiation entry window 9, covering all measuring chambers 3, is provided, by means of which the manufacturing expense can be reduced.

Figure 7:
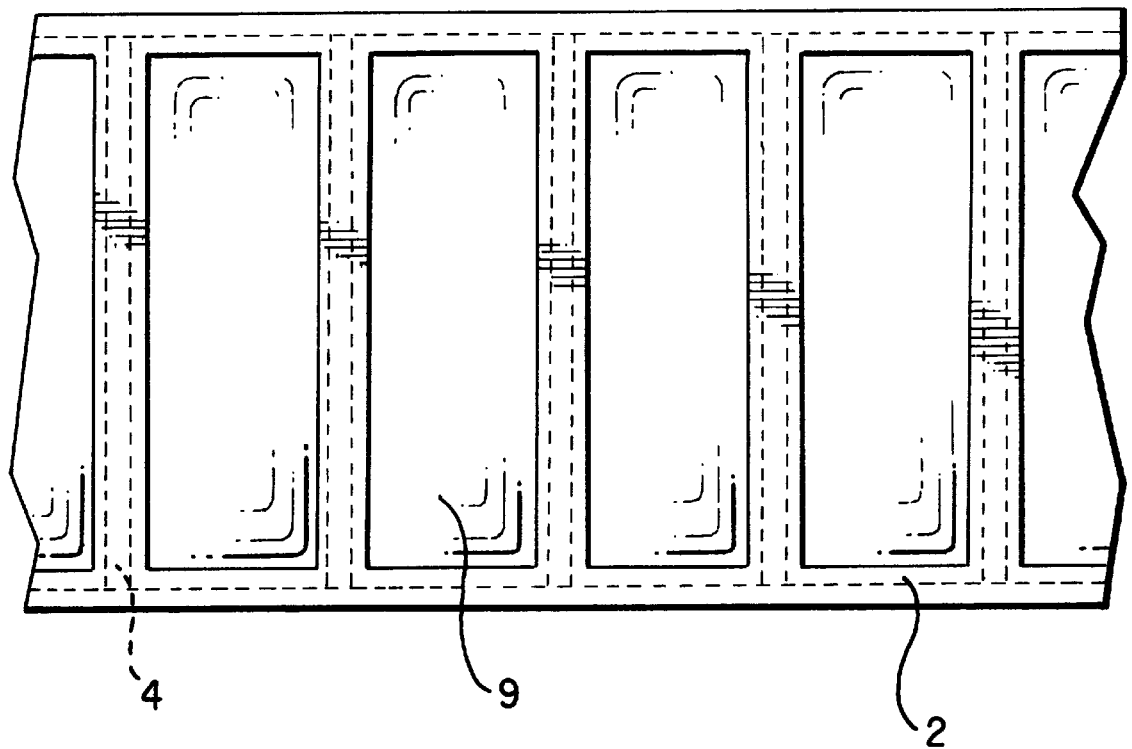
FIG. 7 shows an arrangement of sections in rows with radiation entry windows of large area.

A further variation of the detector arrangement 1 is evident from FIG. 7. The radiation entry windows 9 have a particularly large rectangular cross section so that a high sensitivity/resolution is achieved even in the case of a soft radiation source 15.

Figure 8:
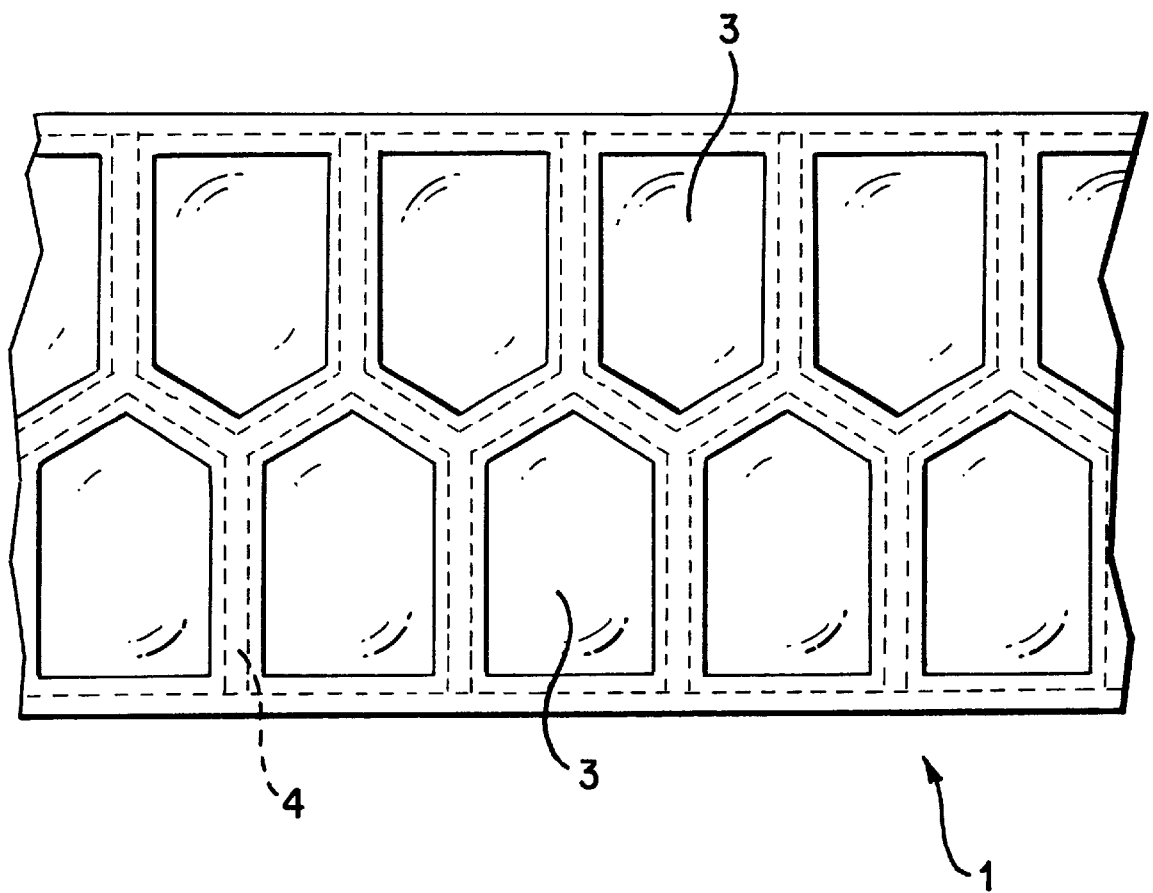
FIG. 8 shows an arrangement of sections in two rows.

In order to achieve a good resolution over the width of the material 16 being measured, the measuring chambers 3 can also be disposed offset in two rows as shown in FIG. 8. In this case, if the radiation divergence transverse to the longitudinal extent is adequate, a linear source 15 of radiation, in conjunction with an appropriate collimator 18, is sufficient.

The apparatus for checking weights per unit area, described above, is manufactured particularly easily, since the expensive adjustment and alignment processes can be omitted. Moreover, there are no traversing processes, since the measurement of the weight per unit area is carried out with stationary elements. At the same time, a thickness profile can be determined over the whole width of the material 16 and the manufacturing process can thus be adjusted directly.

What is claimed is:

1. An apparatus for checking weights per unit area during production of a sheet of material having first and second sides opposite one another, comprising:
   a source of radiation disposed on one side of a path of travel of the sheet of material to irradiate a width of said first side of the sheet of material with a linear distribution of radiation;
   a detector assembly disposed on another side of said path of travel of the sheet of material and having a common housing with a cover and a plurality of measurement chambers disposed in alignment with said source of radiation and to extend over the width of the sheet of material facing said second side of the sheet of material to receive radiation passing through the sheet of material, each of said measurement chambers being bounded by wall electrodes with a collector electrode therebetween;
   said measurement chambers being communicated to one another to permit joint evacuation and filling with ionizable gas; and
   said cover defining individual radiation entry windows respectively for each of said measurement chambers.

2. The apparatus of claim 1, further comprising a source of potential difference between said wall electrodes and respective one of said collector electrodes.

3. The apparatus of claim 1, wherein said housing has a bottom and the collector electrodes are mounted on electrically conducting connecting pieces which are embedded via insulators in the bottom of the housing.

4. The apparatus of claim 1, 2 or 3, wherein said measurement chambers are disposed next to one another and cover a whole width of the sheet of material that is to be measured.

5. The apparatus of claim 1, 2 or 3, wherein said source of radiation is an isotope source.

6. The apparatus of claim 5, wherein said isotope source extends over all said measurement chambers.

7. The apparatus of claim 6, wherein a collimator is assigned to said source of radiation.

8. The apparatus of claim 7, wherein said collimator is disposed between said source of radiation and the path of the sheet of material.

9. The apparatus of claim 7, wherein said collimator is disposed between said detector assembly and said path of the sheet of material.

10. An apparatus for checking weights per unit area during production of a sheet of material having first and second sides opposite one another, comprising:
    a source of radiation disposed on one side of a path of travel of the sheet of material to irradiate a width of said first side of the sheet of material with a linear distribution of radiation;
    a detector assembly disposed on another side of said path of travel of the sheet of material and having a common housing with a plurality of measurement chambers disposed in alignment with said source of radiation and to extend over the width of the sheet of material facing said second side of the sheet of material to receive radiation passing through the sheet of material, each of said measurement chambers being bounded by wall electrodes with a collector electrode therebetween;
    said measurement chambers being communicated to one another to permit joint evacuation and filling with ionizable gas; and
    each of said measurement chambers having a radiation entry window of a shape corresponding to a shape of a cross section of measurement chambers taken parallel to said radiation entry windows.

11. The apparatus of claim 10, wherein the shape of said radiation entry windows and the cross sections of said measurement chambers are circular and are disposed next to one another.

12. The apparatus of claim 10, wherein said source of radiation includes a point-shaped source of radiation is assigned to each of said measurement chambers.

13. The apparatus of claim 12, wherein said point-shaped sources of radiation are disposed at an equal distance from said measurement chambers.

14. The apparatus of claim 10, wherein said source of radiation includes a soft beta emitter.

15. The apparatus of claim 10, wherein said source of radiation includes an industrial radiating system.

16. An apparatus for checking weights per unit area during production of a sheet of material having first and second sides opposite one another, comprising:
    a source of radiation disposed on one side of a path of travel of the sheet of material to irradiate a width of said first side of the sheet of material with a linear distribution of radiation;
    a detector assembly disposed on another side of said path of travel of the sheet of material and having a common housing with a plurality of measurement chambers disposed in alignment with said source of radiation and to extend over the width of the sheet of material facing said second side of the sheet of material to receive radiation passing through the sheet of material, each of said measurement chambers being bounded by wall electrodes with a collector electrode therebetween;
    said measurement chambers being communicated to one another to permit joint evacuation and filling with ionizable gas; and
    each of said measurement chambers having a radiation entry window of circular shape and said measurement chambers having an angular construction.

17. An apparatus for checking weights per unit area during production of a sheet of material having first and second sides opposite one another,comprising:
    a source of radiation disposed on one side of a path of travel of the sheet of material to irradiate a width of said first side of the sheet of material with a linear distribution of radiation;
    a detector assembly disposed on another side of said path of travel of the sheet of material and having a common housing with a plurality of measurement chambers disposed in alignment with said source of radiation and to extend over the width of the sheet of material facing said second side of the sheet of material to receive radiation passing through the sheet of material each of said measurement chambers being bounded by wall electrodes with a collector electrode therebetween;

said measurement chambers being communicated to one another to permit joint evacuation and filling with ionizable gas; and said measurement chamber being disposed next to one another in at least two rows wherein ones of said measurement chambers of a first row of said at least two rows are offset from other ones of said measurement chambers of a second row of said at least two rows.

18. An apparatus for checking weights per unit area during production of a sheet of material having first and second sides opposite one another, comprising:

a source of radiation disposed on one side of a path of travel of the sheet of material to irradiate a width of said first side of the sheet of material with a linear distribution of radiation;

a detector assembly disposed on another side of said path of travel of the sheet of material and having a common housing with a plurality of measurement chambers disposed in alignment with said source of radiation and to extend over the width of the sheet of material facing said second side of the sheet of material to receive radiation passing through the sheet of material, each of said measurement chambers being bounded by wall electrodes with a collector electrode therebetween and having a radiation entry window;

said measurement chambers being communicated to one another to permit joint evacuation and filling with ionizable gas;

said source of radiation being an isotope source extending over all said measurement chambers; and a collimator disposed between said detector assembly and said path of the sheet of material, said collimator having openings with a cross section smaller than a cross section of the radiation entry windows.

19. The apparatus of claim 18, wherein said openings of said collimator are defined by walls that diverge in direction toward said detector assembly.

20. The apparatus of claim 19, wherein said source of radiation is disposed directly above the path of the sheet of material.

21. The apparatus of claim 20, further comprising current-voltage converters receiving outputs of each of the collector electrodes.

22. The apparatus of claim 21, further comprising a digitizer supplied with outputs the current-voltage converter (20) producing digitized measurement values and one of a parallel or serially interface for outputting said digitized measurement values.

23. The apparatus of any one of claims 10, 16, 17 or 18, further comprising a source of potential difference between said wall electrodes and respective ones of said collector electrodes.

24. The apparatus of any one of claims 10, 16, 17, or 18, wherein said housing has a bottom and the collector electrodes are mounted on electrically conducting connecting pieces which are embedded via insulators in the bottom of the housing.

25. The apparatus of any one of claims 10, 16, 17 or 18, wherein said source of radiation is an isotope source.

26. The apparatus of claim 25, wherein said isotope source extends over all said measurement chambers.

27. The apparatus of claim 26, wherein a collimator is assigned to said source radiation.

28. The apparatus of claim 27, wherein said collimator is disposed between said source of radiation and the sheet of material.

29. The apparatus of claim 28, wherein said collimator is disposed between said detector assembly and said path of the sheet of material.

* * * * *